(12) United States Patent
Guo

(10) Patent No.: US 12,133,104 B2
(45) Date of Patent: Oct. 29, 2024

(54) METHOD AND DEVICE FOR DETERMINING PRIORITY LEVEL OF CSI REPORT

(71) Applicant: GUANGDONG OPPO MOBILE TELECOMMUNICATIONS CORP., LTD., Guangdong (CN)

(72) Inventor: Li Guo, Allen, TX (US)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 445 days.

(21) Appl. No.: 17/482,223

(22) Filed: Sep. 22, 2021

(65) Prior Publication Data
US 2022/0014957 A1 Jan. 13, 2022

Related U.S. Application Data

(63) Continuation of application No. PCT/CN2020/116611, filed on Sep. 21, 2020.
(Continued)

(51) Int. Cl.
*H04W 24/10* (2009.01)
*H04L 5/00* (2006.01)
(Continued)

(52) U.S. Cl.
CPC ........... *H04W 24/10* (2013.01); *H04L 5/0053* (2013.01); *H04W 72/21* (2023.01); *H04W 72/56* (2023.01)

(58) Field of Classification Search
CPC ..... H04W 24/10; H04W 72/21; H04W 72/56; H04W 48/16; H04W 28/10; H04L 5/0053; H04L 5/0057; H04B 7/0626; H04B 7/0645
See application file for complete search history.

(56) References Cited

U.S. PATENT DOCUMENTS 11,463,142 B2 * 10/2022 Rahman ............... H04B 7/0478
2013/0114455 A1 5/2013 Yoo et al.
(Continued)

FOREIGN PATENT DOCUMENTS

CN 103107866 A 5/2013
CN 104081827 A 10/2014
(Continued)

OTHER PUBLICATIONS

CATT: "Clarification of PUSCH with SP-CSI overlapping with PUSCH with data", 3GPP Draft; 38214_CR0042_(REL-15) R1-1909886, 3rd Generation Partnership Project (3GPP), Mobile Competence Centre; 650 Route Des Lucioles; F-06921 Sophia-Antipolis Cedex; France vol. RAN WG1, No. Prague, CZ; Aug. 26, 2019-Aug. 30, 2019 Sep. 11, 2019 (Sep. 11, 2019 ), XP051782495.
(Continued)

*Primary Examiner* — Jay P Patel
(74) *Attorney, Agent, or Firm* — Ladas & Parry LLP

(57) ABSTRACT

A method and a device for determining a priority level of a channel state information (CSI) report are provided. The method includes following operations. The UE determines priority levels of at least two CSI reports, the at least two CSI reports include a first CSI report, and the first CSI report carries Layer 1 Signal to Interference Noise Ratio (L1-SINR). The priority levels of the at least two CSI reports are used to multiplex the at least two CSI reports or drop at least a part of the at least two CSI reports in response to that there is an overlapping part in time domain resources of the at least two CSI reports.

11 Claims, 6 Drawing Sheets

---

The UE determines priority levels of at least two CSI reports. The at least two CSI reports include a first CSI report, and the first CSI report carries an L1-SINR. The priority levels of the at least two CSI reports are used to multiplex the at least two CSI reports or drop at least a part of the at least two CSI reports when there is an overlapping part in time-domain resources of the at least two CSI reports

201

Related U.S. Application Data

(60) Provisional application No. 62/904,485, filed on Sep. 23, 2019.

(51) Int. Cl.
*H04W 72/21* (2023.01)
*H04W 72/56* (2023.01)

(56) References Cited

U.S. PATENT DOCUMENTS

| | | | |
|---|---|---|---|
| 2013/0195045 A1 | 8/2013 | Papasakellariou et al. | |
| 2015/0244443 A1 | 8/2015 | Papasakellariou et al. | |
| 2018/0219664 A1* | 8/2018 | Guo | H04W 24/10 |
| 2019/0082435 A1 | 3/2019 | Noh et al. | |
| 2019/0215136 A1* | 7/2019 | Zhou | H04L 1/1819 |
| 2019/0268061 A1* | 8/2019 | Li | H04B 17/17 |
| 2019/0349061 A1* | 11/2019 | Cirik | H04W 72/046 |
| 2019/0357292 A1* | 11/2019 | Cirik | H04L 5/0053 |
| 2020/0137821 A1* | 4/2020 | Cirik | H04B 7/063 |
| 2020/0260300 A1* | 8/2020 | Cirik | H04B 7/0695 |
| 2020/0288479 A1 | 9/2020 | Xi et al. | |
| 2020/0358540 A1* | 11/2020 | Yokomakura | H04L 5/0057 |
| 2021/0006456 A1* | 1/2021 | Kim | H04W 72/20 |
| 2021/0067304 A1* | 3/2021 | Yokomakura | H04W 72/23 |
| 2021/0105636 A1* | 4/2021 | Yang | H04W 16/14 |
| 2021/0345141 A1* | 11/2021 | Cao | H04W 24/10 |
| 2022/0007359 A1 | 1/2022 | Noh et al. | |
| 2022/0070853 A1* | 3/2022 | Guo | H04B 7/0695 |
| 2022/0149924 A1* | 5/2022 | Zhang | H04W 72/1263 |
| 2022/0191726 A1* | 6/2022 | Matsumura | H04L 5/0048 |
| 2022/0295302 A1* | 9/2022 | Matsumura | H04W 76/19 |
| 2022/0303999 A1* | 9/2022 | Chung | H04L 5/0057 |
| 2022/0322247 A1* | 10/2022 | Sun | H04W 52/42 |
| 2022/0360312 A1* | 11/2022 | Rupasinghe | H04L 5/0055 |
| 2023/0208490 A1* | 6/2023 | Kim | H04B 7/0626 370/329 |
| 2023/0318686 A1* | 10/2023 | Kwak | H04B 7/088 455/101 |

FOREIGN PATENT DOCUMENTS

| | | | | |
|---|---|---|---|---|
| CN | 107682138 A | | 2/2018 | |
| CN | 108370578 A | | 8/2018 | |
| CN | 110830094 B | * | 11/2021 | H04B 7/0626 |
| CN | 114374418 A | * | 4/2022 | |
| EP | 3454491 A1 | | 3/2019 | |
| EP | 3958607 A1 | * | 2/2022 | H04B 17/336 |
| WO | 2017115948 A1 | | 7/2017 | |
| WO | 2019099659 A1 | | 5/2019 | |
| WO | WO-2020063480 A1 | * | 4/2020 | H04L 1/0023 |
| WO | WO-2020213163 A1 | * | 10/2020 | H04B 17/336 |

OTHER PUBLICATIONS

Supplementary European Search Report in the European application No. 20868763.2, mailed on Mar. 10, 2022.
First Office Action of the Chinese application No. 202110846026.8, issued on Nov. 15, 2022.
First Office Action of the European application No. 20868763.2, issued on Dec. 16, 2022.
Spreadtrum Communications. "Discussion on multi-beam operation", 3GPP TSG RAN WG1 #98bis R1-1910024, Oct. 1, 2019 (Oct. 1, 2019), entire document.
Huawei et al. "Enhancements on multi-beam operation", 3GPP TSG RAN WG1 Meeting #98bis R1-1910074, Oct. 5, 2019 (Oct. 5, 2019), entire document.
Intel Corp. "Discussion on multi-beam enhancements", 3GPP TSG RAN WG1 Meeting #99 R1-1912223, Nov. 9, 2019 (Nov. 19, 2019), entire document.
Ericsson. "Summary of views on CSI reporting v3", 3GPP TSG-RAN WG1 Meeting #95 R1-1814088, Nov. 15, 2018 (Nov. 15, 2018), entire document.
Huawei et al. "Beam measurement and reporting using LI-SINR", 3GPP TSG RAN WG1 Meeting #95 R1-1813560, Nov. 3, 2018 (Nov. 3, 2018), the entire document.
ZTE. "Details and LLS evaluation on LI-SINR measurement and reporting", 3GPP TSG RAN WG1 Meeting #96bis R1-1904025, Mar. 30, 2019 (Mar. 30, 2019), the entire document.
International Search Report in the international application No. PCT/CN2020/116611, mailed on Dec. 21, 2020.
Written Opinion of the International Search Authority in the international application PCT/CN2020/116611, mailed on Dec. 21, 2020.
3GPP TS 38.211 V15.5.0 (Mar. 2019), 3rd Generation Partnership Project; Technical Specification Group Radio Access Network; NR; Physical channels and modulation (Release 15), dated Mar. 2019, entire document.
3GPP TS 38.212 V15.5.0 (Mar. 2019), 3rd Generation Partnership Project; Technical Specification Group Radio Access Network; NR; Multiplexing and channel coding (Release 15), dated Mar. 2019, entire document.
3GPP TS 38.213 V15.5.0 (Mar. 2019), 3rd Generation Partnership Project; Technical Specification Group Radio Access Network; NR; Physical layer procedures for control (Release 15), dated Mar. 2019, entire document.
3GPP TS 38.214 V15.5.0 (Mar. 2019), 3rd Generation Partnership Project; Technical Specification Group Radio Access Network; NR; Physical layer procedures for data (Release 15), dated Mar. 2019, entire document.
3GPP TS 38.215 V15.5.0 (Jun. 2019), 3rd Generation Partnership Project; Technical Specification Group Radio Access Network; NR; Physical layer measurements (Release 15), dated Jun. 2019, entire document.
3GPP TS 38.321 V15.5.0 (Mar. 2019), 3rd Generation Partnership Project; Technical Specification Group Radio Access Network; NR; Medium Access Control (MAC) protocol specification (Release 15), dated Mar. 2019, entire document.
3GPP TS 38.331 V15.5.0 (Mar. 2019), 3rd Generation Partnership Project; Technical Specification Group Radio Access Network; NR; Radio Resource Control (RRC) protocol specification (Release 15), dated Mar. 2019, entire document.

* cited by examiner

The UE determines priority levels of at least two CSI reports. The at least two CSI reports include a first CSI report, and the first CSI report carries an L1-SINR. The priority levels of the at least two CSI reports are used to multiplex the at least two CSI reports or drop at least a part of the at least two CSI reports when there is an overlapping part in time-domain resources of the at least two CSI reports — 201

FIG. 2

METHOD AND DEVICE FOR DETERMINING PRIORITY LEVEL OF CSI REPORT

CROSS-REFERENCE TO RELATED APPLICATIONS

This is a continuation application of International Patent Application No. PCT/CN2020/116611, filed on Sep. 21, 2020, which claims priority to U.S. Patent Application No. 62/904,485, filed on Sep. 23, 2019, the entire contents of which are incorporated herein by their reference.

BACKGROUND

A CSI report with a Layer 1 Signal to Interference Noise Ratio (L1-SINR) is newly introduced. A priority rule for the CSI report with the L1-SINR is not defined yet, which results in that a UE does not know how to multiplex or drop CSI reports when the CSI report with L1-SINR collides with another CSI report, and the system does not know what is transmitted by the UE when the collision happens. Therefore, the system operation is broken.

SUMMARY

The embodiments of the disclosure relate to the technical field of mobile communication, and more particularly to a method and device for determining a priority level of a channel state information (CSI) report.

A first aspect of the embodiments of the present disclosure provides the method for determining a priority level of a CSI report according to the embodiments of the disclosure, which includes the following operations.

A UE determines priority levels of at least two CSI reports. The at least two CSI reports include a first CSI report, and the first CSI report carriers a Layer 1 Signal to Interference Noise Ratio (L1-SINR).

The priority levels of the at least two CSI reports are used to multiplex the at least two CSI reports or drop at least a part of the at least two CSI reports when there is an overlapping part in time-domain resources of the at least two CSI reports.

A second aspect of the embodiments of the present disclosure provides a device for determining a priority level of a CSI report, which includes a processor, and a memory configured to store a computer program. The processor is configured to call and run the computer program stored in the memory to determine priority levels of at least two CSI reports. The at least two CSI reports include a first CSI report, and the first CSI report carriers a Layer 1 Signal to Interference Noise Ratio (L1-SINR).

The priority levels of the at least two CSI reports are used to multiplex the at least two CSI reports or drop at least a part of the at least two CSI reports when there is an overlapping part in time-domain resources of the at least two CSI reports.

With the above technical solution, the first CSI report which carries the LI-SINR is introduced, and a priority level of the first CSI report is determined. Therefore, the UE can know how to multiplex or drop the CSI reports when there is an overlapping part in time-domain resources of the first CSI report and other CSI report.

BRIEF DESCRIPTION OF THE DRAWINGS

The drawings described herein are adopted to provide a further understanding to the disclosure and form a part of the disclosure. Schematic embodiments of the disclosure and descriptions thereof are adopted to explain the disclosure and not intended to form improper limits to the disclosure. In the drawings:

FIG. 2 is a schematic flowchart of a method for determining a priority level of a CSI report according to an embodiment of the disclosure.

DETAILED DESCRIPTION

The technical solutions according to the embodiments of the disclosure are described below in conjunction with the accompany drawings of the embodiments of the disclosure. Apparently, the described embodiments are only a part rather than all of the embodiments. Based on the embodiments of the disclosure, all other embodiments acquired by those skilled in the art without paying creative labor based on the embodiments of the disclosure all fall within the scope of protection of the disclosure.

The technical solutions of the embodiments of the disclosure may be applied to various communication systems, for example a long term evolution (LTE) system, a LTE frequency division duplex (FDD) system, a LTE time division duplex (TDD) system, a 5G communication system and a future communication system.

Figure 1:
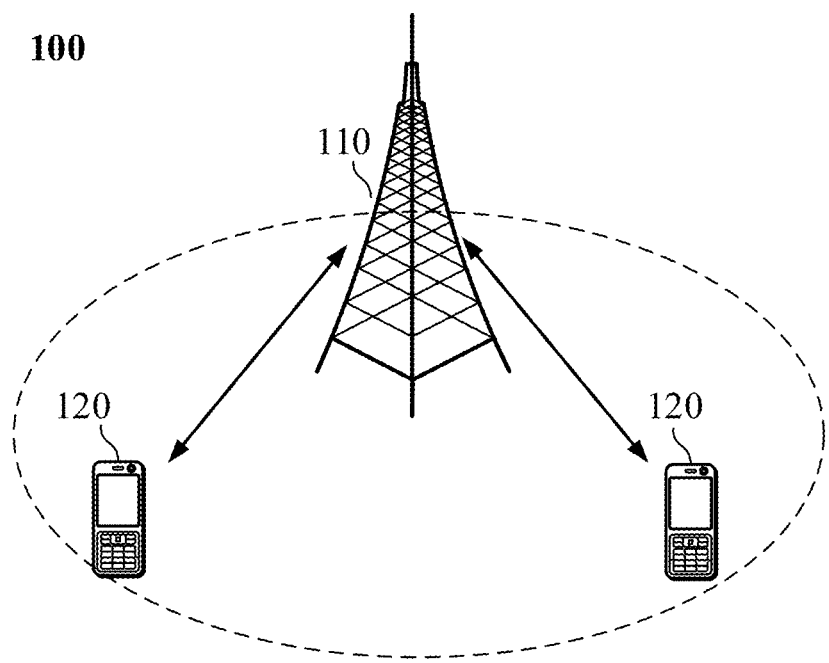
FIG. 1 is a schematic diagram of architecture of a communication system according to an embodiment of the disclosure.

Exemplarily, a communication system 100 to which the embodiments of the disclosure are applied is shown in FIG. 1. The communication system 100 may include a network device 110, which may be a device communicating with a terminal 120 (also referred to as a communication terminal, a terminal). The network device 110 may provide communication coverage in a specified geographical area, and may communicate with a terminal located within the coverage. Alternatively, the network device 110 may be an evolutional base station (Evolutional Node B, eNodeB or eNB) or a radio controller in a cloud radio access network (CRAN) in the LTE system. Alternatively, the network device may be a mobile switching center, a relay station, an access point, on-board equipment, a wearable device, a hub, a switch, a network bridge, a router, a network-side device in the 5G network or a network in a future communication system.

The communication system 100 further includes at least one terminal 120 located within the coverage of the network device 110. The "terminal" used herein includes but is not limited to the connection via wired lines, such as public switched telephone networks (PSTN) and digital subscriber lines Line (DSL), a digital cable, a direct cable connection; and/or another data connection/network; and/or via wireless interface, such as for cellular network, wireless local area network (WLAN), such as a DVB-H Digital television network, a satellite network, an AM-FM broadcast transmitter of the network; and/or device configured to receive/send communication signals of another terminal; and/or Internet of things (JOT) device. A terminal configured to communicate via a wireless interface may be referred to as a "wireless communication terminal", "wireless terminal" or "mobile terminal". Examples of mobile terminals include, but are not limited to, satellites or cellular phones; personal communications systems (PCS) that can combine cellular radiotelephony with data processing, fax, and data communication capabilities; PDAs that may include radiophones, pagers, Internet/intranet access, web browsers, notebooks, calendars, and/or global positioning system (GPS) receivers; and conventional laptop and/or handheld receivers or other electronic devices including radiophone transceivers. The terminal can refer to an access terminal, a user equipment (UE), a user unit, a user station, a mobile station, a mobile station, a remote station, a remote terminal, a mobile device, a user terminal, a terminal, a wireless communication device, a user agent or a user device. Access terminals can be a cellular telephone, a cordless telephone, a session initiation protocol (SIP) telephone, a wireless local loop (WLL) station, a personal digital processing (PDP) Assistant, a handheld device with wireless communication function, a computing device or other processing device connected to a wireless modem, an on-board device, a wearable device, a terminal in 5G network or a terminal in PLMN evolving in the future Optionally, the terminals 120 may perform communications on Device-to-Device (D2D) direct connection.

Optionally, a 5G communication system or 5G network may also be referred to as a New Radio (NR) system or NR system.

FIG. 1 exemplarily illustrates one network device and two terminals. Optionally, the communication system 100 may include multiple network devices, each of which may include other number of terminals within the coverage thereof, this is not limited in the embodiments of the disclosure.

Optionally, the communication system 100 may further include a network controller, a mobile management entity and other network entities, which are not limited in the embodiments of the disclosure.

It should be understood that a device having a communication function in the network system in the embodiments of the disclosure may be referred to as a communication device. Taking the communication system 100 illustrated in FIG. 1 as an example, the communication device may include a network device 1109 and a terminal 120 which have a communication function. The network device 110 and the terminal 120 may be the device described above, which is not described repeatedly herein anymore. The communication device may further include other device in the communication system 100, for example, a network controller, a mobile management entity and other network entity, which is not limited in the embodiments of the disclosure.

It should be understood that the terms "system" and "network" herein may be exchanged in the specification. The terms "and/or" herein may be an association relation for describing associated objects, which may represent that there are three relations. For example, A and/or B may indicate a case that there is only A, a case that there are both A and B, and a case that there is only B. In addition, the character "I" generally represent a "or" relation between the associated objects.

For easily understanding the technical solutions in the embodiments of the disclosure, the technical solutions in the embodiments of the disclosure are illustrated below.

In the NR specification release 15, a priority rule is defined for the CSI report with layer-1 reference signal received power (L1-RSRP)/channel quality indicator (CQI)/precoding matrix index (PMI)/rank indicator (RI)/layer indicator (LI).

In the NR specification release 15, the CSI report may be an L1-RSRP/CSI-reference signal resource indicator (CRI), L1-RSRP/Subscriber station (SS) physical broadcast channel (PBCH) block resource indicator (SSBRI), CRI/RI/precoding matrix indicator (PMI)/CQI, CRI/RI/LI/PMI/CQI, CRI/RI/i1, CRI/RI/CQI or CRI/i1/CQI. For various measurement purposes, a system may configure a UE with multiple CSI reports. The slot location and symbol location for each CSI report is configured separately. Thus, the UE might be configured to report multiple CSI reports in one slot, and those CSI reports may overlap in time domain. A priority rule is specified for the CSI reports, so that the UE can determine how to multiplex or drop the CSI reports when CSI reports overlap in time domain. A periodic CSI report has a higher priority than a semi-persistent CSI report, and the semi-persistent CSI report has a higher priority than an aperiodic CSI report. A CSI report for reporting the L1-RSRP has a lower priority than a CSI report for other reporting quantities. Specifically, the CSI report is associated with a priority value $Pri_{iCSI}(y, k, c, s)$. $Pri_{iCSI}(y, k, c, s)$ is determined according to the following formula:

$$Pri_{iCSI}(y,k,c,s)=2 \cdot N_{cells} \cdot M_s \cdot y + N_{cells} \cdot M_s \cdot k + M_s \cdot c + s$$

y=0 for an aperiodic CSI report to be carried on a physical uplink shared channel (PUSCH), y=1 for a semi-persistent CSI report to be carried on the PUSCH, y=2 for a semi-persistent CSI report to be carried on a physical uplink control channel (PUCCH), and y=3 for a periodic CSI report to be carried on the PUCCH.

k=0 for a CSI report which carries the L1-RSRP, and k=1 for a CSI report which does not carry the L1-RSRP.

c denotes a serving cell index and $N_{cells}$ denotes a value of a higher layer parameter maxNrofServingCells.

s denotes a reportConfigID and $M_s$ denotes a value of the higher layer parameter maxNrofCSI-ReportConfigurations.

For two CSI reports, a first CSI report has a higher priority level over a second CSI report if $Pri_{iCSI}(y, k, c, s)$ value associated with the first CSI report is lower than that associated with the second CSI report.

When the PUCCH or PUSCH scheduled to carry the two CSI reports overlap in at least one OFDM symbol in time domain, the two CSI reports collide with each other. When two CSI reports collide with each other, the two CSI reports are multiplexed or dropped according to the priority values.

For L1-SINR based beam reporting, agreement is reached to support reporting contents as following table:

TABLE 1

| CSI report number | CSI fields |
|---|---|
| CSI report #n | CRI or SSBRI #1, if reported<br>CRI or SSBRI #2, if reported<br>CRI or SSBRI #3, if reported<br>CRI or SSBRI #4, if reported<br>SINR #1, if reported<br>Differential SINR #2, if reported<br>Differential SINR #3, if reported<br>Differential SINR #4, if reported |

The report mapping for a SINR value may refer to Table 2 as follows.

TABLE 2

| Reported value | Measured quantity value | Unit |
|---|---|---|
| SS-SINR_0 | SS-SINR < −23 | dB |
| SS-SINR_1 | −23 ≤ SS-SINR < −22.5 | dB |
| SS-SINR_2 | −22.5 ≤ SS-SINR < −22 | dB |
| SS-SINR_3 | −22 ≤ SS-SINR < −21.5 | dB |
| SS-SINR_4 | −21.5 ≤ SS-SINR < −21 | dB |
| ... | ... | ... |
| SS-SINR_123 | 38 ≤ SS-SINR < 38.5 | dB |
| SS-SINR_124 | 38.5 ≤ SS-SINR < 39 | dB |
| SS-SINR_125 | 39 ≤ SS-SINR < 39.5 | dB |
| SS-SINR_126 | 39.5 ≤ SS-SINR < 40 | dB |
| SS-SINR_127 | 40 ≤ SS-SINR | dB |

The CSI report with L1-SINR is newly introduced. The priority rule for the CSI report with L1-SINR is not defined yet, which results in that a UE does not know how to multiplex or drop CSI reports when the CSI report with L1-SINR collides with another CSI report, and the system does not know what is transmitted by the UE when the collision happens. Therefore, the system operation is broken.

In view of this, the following technical solutions according to the embodiments of the disclosure are provided. In the disclosure, a method for defining a priority rule for L1-SINR beam reporting is presented. In the NR system, the CSI report can be an L1-RSRP based beam report, an L1-SINR beam report and a CRI/CQI/PMI/RI based CSI report. The priority rule is required when two different CSI reports collide with each other in uplink resource for the UE, to properly multiplex or drop the CSI reports. The L1-SINR based beam report is a new CSI report. In a method, the L1-RSRP beam report has a lower priority level than the L1-SINR beam report, and the L1-SINR beam report has a lower priority level than other CSI reports. In another method, the L1-SINR report has the same priority level as the L1-RSRP report. Other method for defining priority levels is also presented.

In the disclosure, the method of multi-beam operation for the L1-SINR reports is presented.

In an embodiment, a UE may be configured with a higher layer parameter reportQuantity set to 'cri-SINR' or 'ssb-index-SINR' to indicate the UE to measure a set of CSI-RS resources or SS/PBCH blocks and then report one or more CRIs/SSBRIs and corresponding L1-SINR measurements.

The UE may be configured with multiple CSI reports having different reporting contents. For example, the UE may report a CRI/L1-RSRP, SSBRI/L1-RSRP, CRI/RI/PMI/CQI, CRI/RI/LI/PMI/CQI, CRI/RI/i1, CRI/RI/CQI, CRI/RI/i1/CQI, CRI/L1-SINR or SSBRI/L1-SINR according to configurations provided by higher layer parameters. The UE may determine a priority level of a CSI report based on the reporting content carried in the CSI report. Specially, the UE may determine a priority level of a CSI report carrying L1-SINR report compared with another CSI report carrying other CSI report contents when the uplink physical channel (for example PUCCH or PUSCH) carrying the two CSI reports overlaps in at least one symbol.

FIG. 2 is a schematic flowchart of a method for determining a priority level of a CSI report according to an embodiment of the disclosure. As shown in FIG. 2, the method for determining a priority level of a CSI report includes operations as follows.

At operation 201, the UE determines priority levels of at least two CSI reports. The at least two CSI reports include a first CSI report, and the first CSI report carries an L1-SINR. The priority levels of the at least two CSI reports are used to multiplex the at least two CSI reports or drop at least a part of the at least two CSI reports when there is an overlapping part in time-domain resources of the at least two CSI reports.

In the embodiment of the disclosure, the UE may determine the priority levels of the at least two CSI reports in one of the following manners.

First Manner

The UE determines that a priority level of a first CSI report is lower than that of a second CSI report, and the priority level of the first CSI report is higher than that of a third CSI report. The second CSI report carries an L1-RSRP, and the third CSI report carries CSI reporting quantities other than the L1-SINR and L1-RSRP.

In the embodiment of the disclosure, a priority value of a CSI report decreases with an increase of the priority level of the CSI report. Based on this, the UE determines that a priority value of the first CSI report is greater than that of the second CSI report, and less than that of the third CSI report.

In an optional manner, the CSI report is associated with a priority value $Pri_{iCSI}(y, k, c, s)$, the priority value $Pri_{iCSI}(y, k, c, s)$ is determined according to the following equation:

$$Pri_{iCSI}(y,k,c,s)=2 \cdot N_{cells} \cdot M_s \cdot y + N_{cells} \cdot M_s \cdot k + M_s \cdot c + s$$

y=0 for an aperiodic CSI report to be carried on a PUSCH, y=1 for a semi-persistent CSI report to be carried on the PUSCH, y=2 for a semi-persistent CSI report to be carried on a PUCCH, and y=3 for a periodic CSI report to be carried on the PUCCH.

k=0 for a CSI report which carries the L1-RSRP or the L1-SINR, and k=1 for a CSI report which does not carry the L1-SINR and the L1-SINR.

c denotes a serving cell index and $N_{cells}$ denotes a value of a higher layer parameter maxNrofServingCells, s denotes a reportConfigID and $M_s$ denotes a value of the higher layer parameter maxNrofCSI-ReportConfigurations.

In an example, the UE may be requested to determine that the priority value of a first CSI report carrying the L1-SINR is higher than that of a second CSI report carrying the L1-RSRP, and the priority value of the first CSI report carrying the L1-SINR is lower than that of a third CSI report carrying CSI report quantities other than the L1-SINR or L1-RSRP. In an example, the UE can be configured to calculate a priority value of a CSI report as follows. The CSI report is associated with a priority value $Pri_{iCSI}(y, k, c, s)=3 \cdot N_{cells} \cdot M_s \cdot y + N_{cells} \cdot M_s \cdot k + M_s \cdot c + s$ where y=0 for an aperiodic CSI report carried on the PUSCH, y=1 for a semi-persistent CSI report carried on the PUSCH, y=2 for a semi-persistent CSI report carried on the PUCCH and y=3 for a periodic CSI report carried on the PUCCH.

k=0 for a CSI report carrying the L1-RSRP, k=1 for a CSI report carrying the L1-SINR, and k=2 for a CSI report neither carrying the L1-RSRP nor L1-SINR, in other words, k=2 for a CSI report which does not carry the L1-RSRP or L1-SINR.

c denotes a serving cell index and $N_{cells}$ denotes a value of the higher layer parameter maxNrofServingCells.

s denotes a reportConfigID and $M_s$ is a value of the higher layer parameter maxNrofCSI-ReportConfigurations.

It should be illustrated that a first CSI report has a higher priority level over a second CSI report if $Pri_{iCSI}(y, k, c, s)$ value associated with the first CSI report is lower than that associated with the second CSI report.

Second Manner

The UE determines that a priority level of a first CSI report is higher than that of a second CSI report, and the priority level of the first CSI report is higher than that of a third CSI report. The second CSI report carries a L1-RSRP, and the third CSI report carries CSI reporting quantities other than the L1-SINR and L1-RSRP.

In the embodiment of the disclosure, a priority value of a CSI report decreases with an increase of the priority level of the CSI report. Based on this, the UE determines that a priority value of the first CSI report is less than that of the second CSI report, and less than that of the third CSI report.

In an optional manner, the CSI report is associated with a priority value $Pri_{iCSI}(y, k, c, s)$, the priority value $Pri_{iCSI}(y, k, c, s)$ is determined according to the following equation:

$$Pri_{iCSI}(y,k,c,s)=3 \cdot N_{cells} \cdot M_s \cdot y + N_{cells} \cdot M_s \cdot k + M_s \cdot c + s$$

y=0 for an aperiodic CSI report to be carried on the PUSCH, y=1 for a semi-persistent CSI report to be carried on the PUSCH, y=2 for a semi-persistent CSI report to be carried on the PUCCH, and y=3 for a periodic CSI report to be carried on the PUCCH.

k=0 for a CSI report which carries a L1-SINR, and k=1 for a CSI report which carries a L1-RSRP, and k=2 for a CSI report which does not carry the L1-RSRP and L1-SINR.

c denotes a serving cell index and $N_{cells}$ denotes a value of a higher layer parameter maxNrofServingCells, s denotes a reportConfigID and $M_s$ denotes a value of the higher layer parameter maxNrofCSI-ReportConfigurations.

In an example, the UE can be requested to determine that the priority value of a first CSI report carrying the L1-SINR is lower than that of a second CSI report carrying the L1-RSRP, and the priority value of the first CSI report carrying the L1-SINR is lower than that of a third CSI report carrying CSI report quantities other than the L1-SINR or L1-RSRP. In an example, the UE can be configured to calculate a priority value of a CSI report as follows. The CSI report is associated with a priority value $Pri_{iCSI}(y, k, c, s)=3 \cdot N_{cells} \cdot M_s \cdot y + N_{cells} \cdot M_s \cdot k + M_s \cdot c + s$.

y=0 for an aperiodic CSI report to be carried on the PUSCH, y=1 for a semi-persistent CSI report to be carried on the PUSCH, y=2 for a semi-persistent CSI report to be carried on the PUCCH and y=3 for a periodic CSI report to be carried on the PUCCH.

k=0 for a CSI report carrying the L1-SINR, k=1 for a CSI report carrying the L1-RSRP, and k=2 for a CSI report neither carrying the L1-RSRP nor the L1-SINR, in other words, k=1 for a CSI report which does not carry the L1-RSRP or L1-SINR.

c denotes a serving cell index and $k_{cells}$ denotes a value of the higher layer parameter maxNrofServingCells.

s denotes a reportConfigID and $M_s$ is a value of the higher layer parameter maxNrofCSI-ReportConfigurations.

It should be illustrated that a first CSI report has a higher priority level over a second CSI report if $Pri_{iCSI}(y, k, c, s)$ value associated with the first CSI report is lower than that associated with the second CSI report.

Third Manner

The UE determines that a priority level of a first CSI report is equal to that of a second CSI report, and the priority level of the first CSI report is lower than that of a third CSI report. The second CSI report carries the L1-RSRP, and the third CSI report carries CSI reporting quantities other than the L1-SINR and L1-RSRP.

In the embodiment of the disclosure, a priority value of a CSI report decreases with an increase of the priority level of the CSI report. Based on this, the UE determines that a priority value of the first CSI report is equal to that of the second CSI report, and greater than that of the third CSI report.

In an optional manner, the CSI report is associated with a priority value $Pri_{iCSI}(y, k, c, s)$, the priority value $Pri_{iCSI}(y, k, c, s)$ is determined according to the following equation:

$$Pri_{iCSI}(y,k,c,s)=2 \cdot N_{cells} \cdot M_s \cdot y + N_{cells} \cdot M_s \cdot k + M_s \cdot c + s$$

y=0 for an aperiodic CSI report to be carried on the PUSCH, y=1 for a semi-persistent CSI report to be carried on the PUSCH, y=2 for a semi-persistent CSI report to be carried on the PUCCH, and y=3 for a periodic CSI report to be carried on the PUCCH.

k=0 for a CSI report which carries the L1-RSRP or L1-SINR, and k=1 for a CSI report which does not carry L1-RSRP and L1-SINR.

c denotes a serving cell index and $N_{cells}$ denotes a value of a higher layer parameter maxNrofServingCells, s denotes a reportConfigID and $M_s$ denotes a value of the higher layer parameter maxNrofCSI-ReportConfigurations.

In an example, the UE can be requested to assume a CSI report carrying L1-SINR has the same priority value as a CSI report carrying L1-RSRP. The motivation for that design is that both L1-SINR and L1-RSRP are used for beam reporting and thus they should have the same priority level. When a CSI report carrying L1-SINR collides with a CSI report carrying L1-RSRP in the same cell, the CSI report with a larger report configuration ID has a higher priority value. The UE can be requested to determine that a first CSI report carrying the L1-SINR has the same priority level as a second CSI report carrying the L1-RSRP, and the priority level of the first CSI report carrying the L1-SINR is lower than that of a third CSI report carrying CSI report quantities other than the L1-SINR or L1-RSRP. In an example, the UE may be configured to calculate a priority value for a CSI report as follows. The CSI report is associated with a priority value $Pri_{iCSI}(y, k, c, s)=2 \cdot N_{cells} \cdot M_s \cdot y + k_{cells} \cdot M_s \cdot k + M_s \cdot c + s$ where y=0 for an aperiodic CSI report to be carried on the PUSCH, y=1 for a semi-persistent CSI report to be carried on the PUSCH, y=2 for a semi-persistent CSI report to be carried on the PUCCH and y=3 for a periodic CSI report to be carried on the PUCCH.

k=0 for a CSI report carrying the L1-SINR or L1-SINR, k=1 for a CSI report carrying neither the L1-RSRP nor L1-SINR, in other words, k=1 for a CSI report which does not carry the L1-RSRP or L1-SINR.

c denotes a serving cell index and $N_{cells}$ denotes a value of the higher layer parameter maxNrofServingCells.

s denotes a reportConfigID and $M_s$ is a value of the higher layer parameter maxNrofCSI-ReportConfigurations.

It should be illustrated that a first CSI report has a higher priority level over a second CSI report if $Pri_{iCSI}(y, k, c, s)$ value associated with the first CSI report is lower than that associated with the second CSI report.

Fourth Manner

The UE determines that a priority level of a first CSI report is higher than that of a second CSI report, and the priority level of the first CSI report is equal to that of a third CSI report. The second CSI report carries the L1-RSRP, and the third CSI report carries other CSI reporting quantities other than the L1-SINR and L1-RSRP.

In the embodiment of the disclosure, a priority value of a CSI report decreases with an increase of the priority level of the CSI report. Based on this, the UE determines that a priority value of the first CSI report is less than that of the second CSI report, and equal to that of the third CSI report.

In an optional manner, the CSI report is associated with a priority value $Pri_{iCSI}(y, k, c, s)$, the priority value $Pri_{iCSI}(y, k, c, s)$ is determined according to the following equation:

$Pri_{iCSI}(y,k,c,s)=2 \cdot N_{cells} \cdot M_s \cdot y + N_{cells} \cdot M_s \cdot k + M_s \cdot c + s$ y=0 for an aperiodic CSI report to be carried on the PUSCH, y=1 for a semi-persistent CSI report to be carried on the PUSCH, y=2 for a semi-persistent CSI report to be carried on the PUCCH, and y=3 for a periodic CSI report to be carried on the PUCCH.

k=0 for a CSI report which carries the L1-SINR, and k=1 for a CSI report which does not carry the L1-RSRP.

c denotes a serving cell index, and $N_{cells}$ denotes a value of a higher layer parameter maxNrofServingCells, s denotes a reportConfigID and $M_s$ denotes a value of the higher layer parameter maxNrofCSI-ReportConfigurations.

In an example, the UE can be requested to assume the CSI report carrying L1-SINR has the same priority value as a CSI report carrying CSI reporting quantities other than the L1-SINR or L1-RSRP. When a CSI report carrying the L1-SINR collides with a CSI report carrying CSI reporting quantities other than the L1-SINR or L1-RSRP in the same cell, the CSI report with a larger report configuration ID has a higher priority value. The UE can be requested to determine that a first CSI report carrying the L1-SINR has a higher priority level that a second CSI report carrying the L1-RSRP, and the priority level of the first CSI report carrying the L1-SINR is same as that of a third CSI report carrying CSI report quantities other than the L1-SINR or L1-RSRP. In an example, the UE can be configured to calculate the priority value for a CSI report as follows. The CSI report is associated with a priority value $Pri_{iCSI}(y, k, c, s) = 2 \cdot N_{cells} \cdot M_s \cdot y + N_{cells} \cdot M_s \cdot k + M_s \cdot c + s$.

y=0 for an aperiodic CSI report to be carried on the PUSCH, y=1 for a semi-persistent CSI report to be carried on the PUSCH, y=2 for a semi-persistent CSI report to be carried on the PUCCH and y=3 for a periodic CSI report to be carried on the PUCCH.

k=0 for a CSI report carrying the L1-SINR, k=1 for a CSI report carrying the L1-RSRP.

c denotes a serving cell index and $N_{cells}$ denotes a value of the higher layer parameter maxNrofServingCells.

s denotes a reportConfigID and $M_s$ is a value of the higher layer parameter maxNrofCSI-ReportConfigurations.

It should be illustrated that a first CSI report has a higher priority level over a second CSI report if $Pri_{iCSI}(y, k, c, s)$ value associated with the first CSI report is lower than that associated with the second CSI report.

In the embodiment of the disclosure, a solution for reporting an L1-SINR is further provided. The UE reports, through a first CSI report, N reference signal resource indicators and an L1-SINR corresponding to each reference signal resource indicator of the N reference signal resource indicators. N is a positive integer. The reference signal resource indicator may be a CRI or an SSBRI (referred to as CRS/SSBRI).

In an optional manner, in a case of N>1, the UE reports an L1-SINR of a first reference signal resource indicator of the N reference signal resource indicators, and a differential L1-SINR of an L1-SINR, in relative to the L1-SINR of the first reference signal resource indicator, of each reference signal resource indicator of N−1 reference signal resource indicators except the first reference signal resource indicator of the N reference signal resource indicators. Further, optionally, the L1-SINR of the first reference signal resource indicator has the greatest value among the N RS resource indicators.

In an optional manner, a reported value of the L1-SINR of the first reference signal resource indicator is characterized by M1 bits. The reported value of the L1-SINR of the first reference signal resource indicator is determined by a range in which a measured quantity value of the L1-SINR of the first reference signal resource indicator is located. M1 is a positive integer. In an example, M1 is equal to 7 (referring to the following Table 3).

A reported value of the differential L1-SINR of each of the N−1 reference signal resource indicators is characterized by M2 bits. The reported value of the differential L1-SINR of the reference signal resource indicator is determined by a range in which a measured quantity value of the differential L1-SINR of the reference signal resource indicator is located. M2 is a positive integer. The measured quantity value of the differential L1-SINR of the reference signal resource indicator refers to a difference of the measured quantity value of the L1-SINR of the reference signal resource indicator, in relative to the measured quantity value of the L1-SINR of the first reference signal resource indicator. In an example, M2 is equal to 3 (referring to the following Table 4a to 4b). In an example, M2 is equal to 5 (referring to the following Table 5a to 5c).

In an example, a UE can be configured to report N CRI/SSBRIs and a corresponding measured L1-SINR quantity value for each reported CRI/SSBRI, and N>1. If N>1, the UE reports an L1-SINR value for a CRI/SSBRI with the greatest L1-SINR, and reports a differential L1-SINR for all other CRI/SSBRIs reported in the same reporting instance. The differential L1-SINR is calculated as a difference between a measured L1-SINR of the CRI and a measured L1-SINR of the CRI that is reported with the greatest L1-SINR in a reporting instance. 7 bits are used for the reported L1-SINR, and the mapping of the measured L1-SINR quantity values to the reported L1-SINRs is defined in Table 3.

TABLE 3

| Reported value | Measured quantity value | Unit |
|---|---|---|
| SS-SINR_0 | SS-SINR < −23 | dB |
| SS-SINR_1 | −23 ≤ SS-SINR < −22.5 | dB |
| SS-SINR_2 | −22.5 ≤ SS-SINR < −22 | dB |
| SS-SINR_3 | −22 ≤ SS-SINR < −21.5 | dB |
| SS-SINR_4 | −21.5 ≤ SS-SINR < −21 | dB |
| ... | ... | ... |
| SS-SINR_123 | 38 ≤ SS-SINR < 38.5 | dB |
| SS-SINR_124 | 38.5 ≤ SS-SINR < 39 | dB |
| SS-SINR_125 | 39 ≤ SS-SINR < 39.5 | dB |
| SS-SINR_126 | 39.5 ≤ SS-SINR < 40 | dB |
| SS-SINR_127 | 40 ≤ SS-SINR | dB |

In a method, 3 bits are used for reporting a differential L1-SINR, and the mapping of the measured differential L1-SINR quantity to the reported values of the differential L1-SINR may be defined in one of Tables 4a, 4b, 4c and 4d, where Δ SINR is a difference in measured L1-SINR from the greatest L1-SINR.

In an example, 0.5 dB step size is used for a reported value of the differential L1-SINR, and a mapping method for the reported value is shown in Table 4a:

TABLE 4a

| Reported value | Measured quantity value(difference in measured SINR from strongest SINR) | Unit |
|---|---|---|
| DIFFSINR_0 | 0 ≥ ΔSINR > −0.5 | dB |
| DIFFSINR_1 | −0.5 ≥ ΔSINR > −1 | dB |
| DIFFSINR_2 | −1 ≥ ΔSINR > −1.5 | dB |
| DIFFSINR_3 | −1.5 ≥ ΔSINR > −2 | dB |
| DIFFSINR_4 | −2 ≥ ΔSINR > −2.5 | dB |

TABLE 4a-continued

| Reported value | Measured quantity value(difference in measured SINR from strongest SINR) | Unit |
|---|---|---|
| DIFFSINR_5 | $-2.5 \geq \Delta SINR > -3$ | dB |
| DIFFSINR_6 | $-3 \geq \Delta SINR > -3.5$ | dB |
| DIFFSINR_7 | $-3.5 \geq \Delta SINR$ | dB |

In an example, 1 dB step size is used for a reported value of the differential L1-SINR, and the mapping method for the reported value is shown in Table 4b:

TABLE 4b

| Reported value | Measured quantity value(difference in measured SINR from strongest SINR) | Unit |
|---|---|---|
| DIFFSINR_0 | $0 \geq \Delta SINR > -1$ | dB |
| DIFFSINR_1 | $-1 \geq \Delta SINR > -2$ | dB |
| DIFFSINR_2 | $-2 \geq \Delta SINR > -3$ | dB |
| DIFFSINR_3 | $-3 \geq \Delta SINR > -4$ | dB |
| DIFFSINR_4 | $-4 \geq \Delta SINR > -5$ | dB |
| DIFFSINR_5 | $-5 \geq \Delta SINR > -6$ | dB |
| DIFFSINR_6 | $-6 \geq \Delta SINR > -7$ | dB |
| DIFFSINR_7 | $-7 \geq \Delta SINR$ | dB |

In an example, 2 dB step size is used for a reported value of the differential L1-SINR, and the mapping method for the reported value is shown in Table 4c:

TABLE 4c

| Reported value | Measured quantity value(difference in measured SINR from strongest SINR) | Unit |
|---|---|---|
| DIFFSINR_0 | $0 \geq \Delta SINR > -2$ | dB |
| DIFFSINR_1 | $-2 \geq \Delta SINR > -4$ | dB |
| DIFFSINR_2 | $-4 \geq \Delta SINR > -6$ | dB |
| DIFFSINR_3 | $-6 \geq \Delta SINR > -8$ | dB |
| DIFFSINR_4 | $-8 \geq \Delta SINR > -10$ | dB |
| DIFFSINR_5 | $-10 \geq \Delta SINR > -12$ | dB |
| DIFFSINR_6 | $-12 \geq \Delta SINR > -14$ | dB |
| DIFFSINR_7 | $-14 \geq \Delta SINR$ | dB |

In an example, 3 dB step size is used for a reported value of the differential L1-SINR, and the mapping method for the reported value is shown in Table 4d:

TABLE 4d

| Reported value | Measured quantity value(difference in measured SINR from strongest SINR) | Unit |
|---|---|---|
| DIFFSINR_0 | $0 \geq \Delta SINR > -3$ | dB |
| DIFFSINR_1 | $-3 \geq \Delta SINR > -6$ | dB |
| DIFFSINR_2 | $-6 \geq \Delta SINR > -9$ | dB |
| DIFFSINR_3 | $-9 \geq \Delta SINR > -12$ | dB |
| DIFFSINR_4 | $-12 \geq \Delta SINR > -15$ | dB |
| DIFFSINR_5 | $-15 \geq \Delta SINR > -18$ | dB |
| DIFFSINR_6 | $-18 \geq \Delta SINR > -21$ | dB |
| DIFFSINR_7 | $-21 \geq \Delta SINR$ | dB |

In a method, 5 bits are used for reporting the differential L1-SINR, and the mapping of the measured differential L1-SINR quantity to the reported value of the differential L1-SINR may be defined in one of Tables 5a, 5b and 5c, where $\Delta$ SINR denotes a difference in measured L1-SINR from the greatest L1-SINR.

In an example, 0.5 dB step size is used for a reported value of the differential L1-SINR, and the mapping method for the reported value is shown in Table 5a:

TABLE 5a

| Reported value | Measured quantity value(difference in measured SINR from strongest SINR) | Unit |
|---|---|---|
| DIFFSINR_0 | $0 \geq \Delta SINR > -0.5$ | dB |
| DIFFSINR_1 | $-0.5 \geq \Delta SINR > -1$ | dB |
| DIFFSINR_2 | $-1 \geq \Delta SINR > -1.5$ | dB |
| DIFFSINR_3 | $-1.5 \geq \Delta SINR > -2$ | dB |
| DIFFSINR_4 | $-2 \geq \Delta SINR > -2.5$ | dB |
| DIFFSINR_5 | $-2.5 \geq \Delta SINR > -3$ | dB |
| ... | ... | ... |
| DIFFSINR_30 | $-15 \geq \Delta SINR > -15.5$ | dB |
| DIFFSINR_31 | $-15.5 \geq \Delta SINR$ | dB |

In an example, 1 dB step size is used for a reported value of the differential L1-SINR, and the mapping method for the reported value is shown in Table 5b:

TABLE 5b

| Reported value | Measured quantity value(difference in measured SINR from strongest SINR) | Unit |
|---|---|---|
| DIFFSINR_0 | $0 \geq \Delta SINR > -1$ | dB |
| DIFFSINR_1 | $-1 \geq \Delta SINR > -2$ | dB |
| DIFFSINR_2 | $-2 \geq \Delta SINR > -3$ | dB |
| DIFFSINR_3 | $-3 \geq \Delta SINR > -4$ | dB |
| DIFFSINR_4 | $-4 \geq \Delta SINR > -5$ | dB |
| DIFFSINR_5 | $-5 \geq \Delta SINR > -6$ | dB |
| ... | ... | ... |
| DIFFSINR_30 | $-30 \geq \Delta SINR > -31$ | dB |
| DIFFSINR_31 | $-31 \geq \Delta SINR$ | dB |

In an example, 2 dB step size is used for a reported value of the differential L1-SINR, and the mapping method for the reported value is shown in Table 5c:

TABLE 5c

| Reported value | Measured quantity value(difference in measured SINR from strongest SINR) | Unit |
|---|---|---|
| DIFFSINR_0 | $0 \geq \Delta SINR > -2$ | dB |
| DIFFSINR_1 | $-2 \geq \Delta SINR > -4$ | dB |
| DIFFSINR_2 | $-4 \geq \Delta SINR > -6$ | dB |
| DIFFSINR_3 | $-6 \geq \Delta SINR > -8$ | dB |
| DIFFSINR_4 | $-8 \geq \Delta SINR > -10$ | dB |
| DIFFSINR_5 | $-10 \geq \Delta SINR > -12$ | dB |
| ... | ... | ... |
| DIFFSINR_30 | $-60 \geq \Delta SINR > -62$ | dB |
| DIFFSINR_31 | $-62 \geq \Delta SINR$ | dB |

Figure 3:
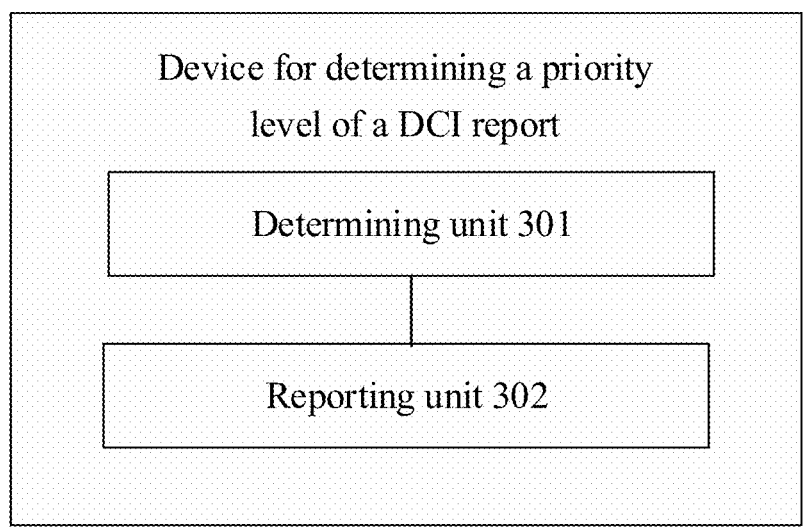
FIG. 3 is a schematic structural diagram of a device for determining a priority level of a CSI report according to an embodiment of the disclosure.
Figure 5:
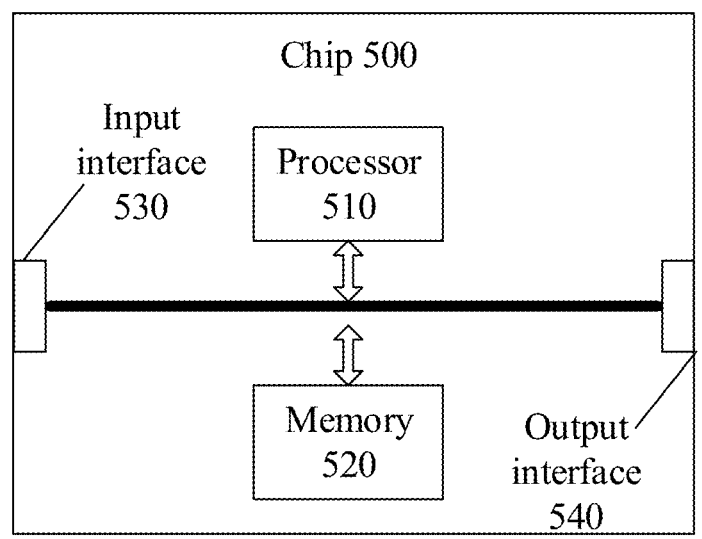
FIG. 5 is a schematic structural diagram of a chip according to an embodiment of the disclosure.

FIG. 5 is a schematic structural diagram of a device for determining a priority level of a CSI report according to an embodiment of the disclosure, which is applied to a UE. As shown in FIG. 3, the device for determining the priority level of the CSI report includes a determining unit 301.

The determining unit 301 is configured to determine priority levels of at least two CSI reports. The at least two CSI reports include a first CSI report, and the first CSI report carries an L1-SINR.

The priority levels of the at least two CSI reports are used to multiplex the at least two CSI reports or drop at least a part of the at least two CSI reports when there is an overlapping part in time-domain resources of the at least two CSI reports.

In an optional manner, the determining unit 301 is configured to determine that a priority level of a first CSI report is lower than that of a second CSI report, and the priority level of the first CSI report is higher than that of a third CSI report.

The second CSI report carries a L1-RSRP, and the third CSI report carries CSI reporting quantities other than the L1-SINR and L1-RSRP.

In an optional manner, the determining unit 301 is configured to determine that a priority level of a first CSI report is higher than that of a second CSI report, and the priority level of the first CSI report is lower than that of a third CSI report.

In an optional manner, the CSI report is associated with a priority value $Pri_{iCSI}(y, k, c, s)$, the priority value $Pri_{iCSI}(y, k, c, s)$ is determined according to the following equation:

$$Pri_{iCSI}(y,k,c,s)=2 \cdot N_{cells} \cdot M_s \cdot y + N_{cells} \cdot M_s \cdot k + M_s \cdot c + s$$

y=0 for an aperiodic CSI report to be carried on a PUSCH, y=1 for a semi-persistent CSI report to be carried on the PUSCH, y=2 for a semi-persistent CSI report to be carried on a PUCCH, and y=3 for a periodic CSI report to be carried on the PUCCH.

k=0 for a CSI report which carries the L1-RSRP and the L1-SINR, and k=1 for a CSI report which does not carry the L1-SINR and the L1-SINR.

c denotes a serving cell index and $N_{cells}$ denotes a value of a higher layer parameter maxNrofServingCells, s denotes a reportConfigID and $M_s$ denotes a value of the higher layer parameter maxNrofCSI-ReportConfigurations.

In an optional manner, the determining unit 301 is configured to determine a priority level of a first CSI report is higher than that of a second CSI report, and the priority level of the first CSI report is higher than that of a third CSI report.

The second CSI report carries the L1-RSRP, and the third CSI report carries CSI reporting quantities other than the L1-SINR and L1-RSRP.

In an optional manner, the determining unit 301 is configured to determine a priority level of a first CSI report is lower than that of a second CSI report, and the priority level of the first CSI report is lower than that of a third CSI report.

In an optional manner, the CSI report is associated with a priority value $Pri_{iCSI}(y, k, c, s)$, and the priority value $Pri_{iCSI}(y, k, c, s)$ is determined according to the following equation:

$$Pri_{iCSI}(y,k,c,s)=3 \cdot N_{cells} \cdot M_s \cdot y + N_{cells} \cdot M_s \cdot k + M_s \cdot c + s$$

y=0 for an aperiodic CSI report to be carried on a PUSCH, y=1 for a semi-persistent CSI report to be carried on the PUSCH, y=2 for a semi-persistent CSI report to be carried on a PUCCH, and y=3 for a periodic CSI report to be carried on the PUCCH.

k=0 for a CSI report which carries the L1-RSRP or L1-SINR, and k=1 for a CSI report which carries the L1-RSRP, and k=2 for a CSI report which does not carry L1-RSRP and L1-SINR.

c denotes a serving cell index and $N_{cells}$ denotes a value of a higher layer parameter maxNrofServingCells, s denotes a reportConfigID and $M_s$ denotes a value of the higher layer parameter maxNrofCSI-ReportConfigurations.

In an optional manner, the determining unit 301 is configured to determine that a priority level of a first CSI report is equal to that of a second CSI report, and the priority level of the first CSI report is lower than that of a third CSI report.

The second CSI report carries the L1-RSRP, and the third CSI report carries CSI reporting quantities other than the L1-SINR and L1-RSRP.

In an optional manner, the determining unit 301 is configured to determine that a priority level of a first CSI report is equal to that of a second CSI report, and the priority level of the first CSI report is higher than that of a third CSI report.

In an optional manner, the CSI report is associated with a priority value $Pri_{iCSI}(y, k, c, s)$, the priority value $Pri_{iCSI}(y, k, c, s)$ is determined according to the following equation:

$$Pri_{iCSI}(y,k,c,s)=2 \cdot N_{cells} \cdot M_s \cdot y + N_{cells} \cdot M_s \cdot k + M_s \cdot c + s$$

y=0 for an aperiodic CSI report to be carried on a PUSCH, y=1 for a semi-persistent CSI report to be carried on the PUSCH, y=2 for a semi-persistent CSI report to be carried on a PUCCH, and y=3 for a periodic CSI report to be carried on the PUCCH.

k=0 for a CSI report which carries the L1-RSRP or L1-SINR, and k=1 for a CSI report which does not carry L1-RSRP and L1-SINR.

c denotes a serving cell index and $N_{cells}$ denotes a value of a higher layer parameter maxNrofServingCells, s denotes a reportConfigID and $M_s$ denotes a value of the higher layer parameter maxNrofCSI-ReportConfigurations.

In an optional manner, the determining unit 301 is configured to determine that a priority level of a first CSI report is higher than that of a second CSI report, and the priority level of the first CSI report is equal to that of a third CSI report.

The second CSI report carries the L1-RSRP, and the third CSI report carries CSI reporting quantities other than the L1-SINR and L1-RSRP.

In an optional manner, the determining unit 301 is configured to determine that a priority level of a first CSI report is lower than that of a second CSI report, and the priority level of the first CSI report is equal to that of a third CSI report.

In an optional manner, the CSI report is associated with a priority value $Pri_{iCSI}(y, k, c, s)$, and the priority value $Pri_{iCSI}(y, k, c, s)$ is determined according to the following equation:

$$Pri_{iCSI}(y,k,c,s)=2 \cdot N_{cells} \cdot M_s \cdot y + N_{cells} \cdot M_s \cdot k + M_s \cdot c + s$$

y=0 for an aperiodic CSI report to be carried on a PUSCH, y=1 for a semi-persistent CSI report to be carried on the PUSCH, y=2 for a semi-persistent CSI report to be carried on a PUCCH, and y=3 for a periodic CSI report to be carried on the PUCCH.

k=0 for a CSI report which carries L1-RSRP, and k=1 for a CSI report which does not carry L1-RSRP.

c denotes a serving cell index and $N_{cells}$ denotes a value of a higher layer parameter maxNrofServingCells, s denotes a reportConfigID and $M_s$ denotes a value of the higher layer parameter maxNrofCSI-ReportConfigurations.

In an optional manner, the device further includes a reporting unit 302.

The reporting unit 302 is configured to report, through a first CSI report, N reference signal resource indicators and an L1-SINR corresponding to each of the N reference signal resource indicators. N is a positive integer.

In an optional manner, in a case of N>1, the reporting unit 302 is configured to report an L1-SINR of a first reference signal resource indicator of the N reference signal resource indicators, and a differential L1-SINR of an L1-SINR, in relative to the L1-SINR of the first reference signal resource indicator, of each reference signal resource indicator of N−1 reference signal resource indicators except the first reference signal resource indicator of the N reference signal resource indicators.

In an optional manner, the L1-SINR of the first reference signal resource indicator has the greatest value among the N reference signal resource indicators.

In an optional manner, a reported value of the L1-SINR of the first reference signal resource indicator is characterized by M1 bits. The reported value of the L1-SINR of the first reference signal resource indicator is determined by a range in which a measured quantity value of the L1-SINR of the first reference signal resource indicator is located. M1 is a positive integer.

In an optional manner, M1 is equal to 7.

In an optional manner, a reported value of the differential L1-SINR of each of the N−1 reference signal resource indicators is characterized by M2 bits. The reported value of the differential L1-SINR of the reference signal resource indicator is determined by a range in which a measured quantity value of the differential L1-SINR of the reference signal resource indicator is located. M2 is a positive integer.

The measured quantity value of the differential L1-SINR of the reference signal resource indicator refers to a difference of the measured quantity value of the L1-SINR of the reference signal resource indicator in relative to the measured quantity value of the L1-SINR of the first reference signal resource indicator.

In an optional manner, M2 is equal to 3 or 5.

It should be understood for related description for the above device for determining a priority level of the CSI report according to the embodiment of the disclosure, reference may be made to the related description for the above method for determining a priority level of the CSI report according to the embodiment of the disclosure for understanding.

Figure 4:
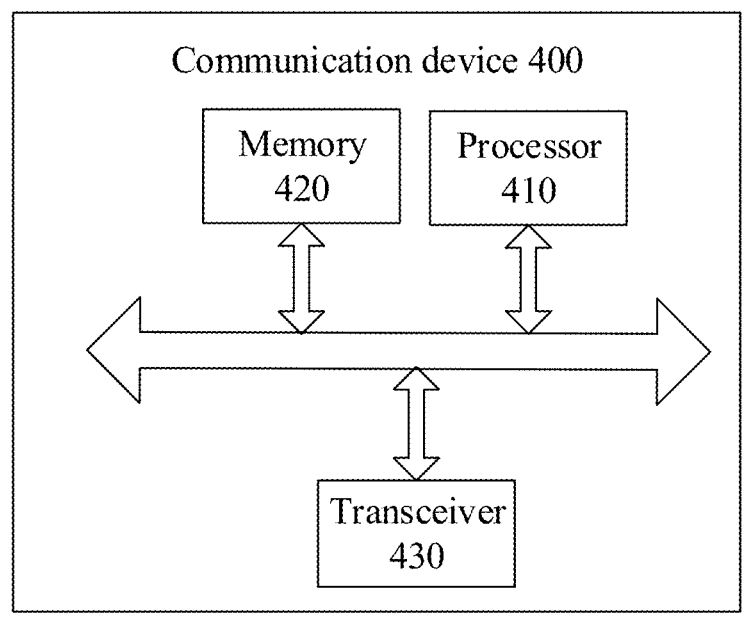
FIG. 4 is a schematic structural diagram of a communication device according to an embodiment of the disclosure.

FIG. 4 is a schematic structural diagram of a communication device 400 provided in the embodiments of the disclosure. The communication device may be a UE or network device. The communication device 400 shown in FIG. 4 includes a processor 410, and the processor 410 may call and run computer programs from memory to realize the method in the embodiments of the disclosure.

Optionally, as illustrated in FIG. 4, the communication device 400 may further include a memory 420. The processor 410 may call and run the computer program from memory 420 to implement the method in the embodiments of the disclosure.

The memory 420 may be a separate device independent of the processor 410 or integrated into the processor 410.

Optionally, as illustrated in FIG. 4, the communication device 400 may also include a transceiver 430. The processor 410 may control the transceiver 430 to communicate with other devices, in particular, to send information or data to other devices, or receive information or data sent by other devices.

The transceiver 430 may include a transmitter and a receiver. The transceiver 430 may further include an antenna (s), the number of which may be one or more.

Optionally, the communication device 400 can be specifically a network device of the embodiment of the disclosure, and the communication device 400 can realize the corresponding process realized by the network device in each method of the embodiments of the disclosure. For the sake of simplicity, it will not be elaborated here.

Optionally, the communication device 400 can be a mobile terminal/UE according to the embodiments of the disclosure, and the communication device 400 can realize the corresponding flow realized by the mobile terminal/UE in the various methods of the embodiments of the disclosure. For the sake of brevity, it will not be described here.

FIG. 5 is a schematic structural diagram of a chip according to an embodiment of the disclosure. The chip 500 illustrated in FIG. 5 includes a processor 510, and the processor 510 may call and run computer programs from memory to implement the method in the embodiments of the disclosure.

Optionally, as illustrated in FIG. 5, the chip 500 may also include a memory 520. The processor 510 can call and run the computer program from memory 520 to implement the method in the embodiments of the disclosure.

The memory 520 may be a separate device independent of the processor 510 or integrated into the processor 510.

Optionally, the chip 500 may also include an input interface 530. The processor 510 can control the input interface 530 to communicate with other devices or chips, and in particular can obtain information or data sent by other devices or chips.

Optionally, the chip 500 may also include an output interface 540. The processor 510 may control the output interface 540 to communicate with other devices or chips, and in particular may output information or data to other devices or chips.

Optionally, the chip can be applied to the network device in the embodiments of the disclosure, and the chip can realize the corresponding process realized by the network device in each method of the embodiments of the disclosure. For the sake of brevity, it will not be elaborated here.

Optionally, the chip can be applied to the mobile terminal/UE in the embodiments of the disclosure, and the chip can realize the corresponding flow realized by the mobile terminal/UE in each method of the embodiment of the disclosure. For the sake of simplicity, it will not be described here.

It is to be understood that the chips mentioned in the embodiments of the disclosure may also be referred to as system level chips, system chips, chip systems or on-chip system chips, etc.

Figure 6:
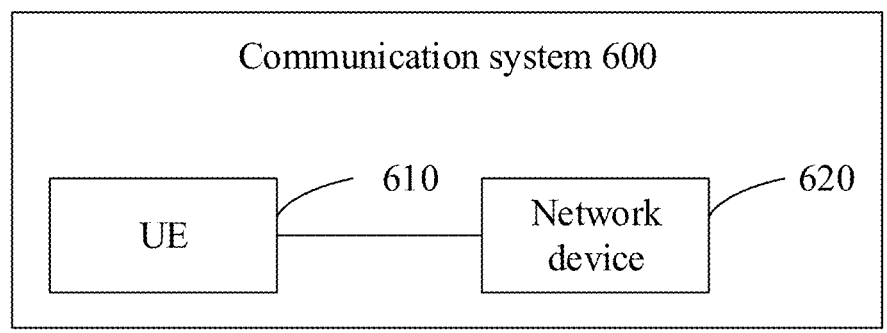
FIG. 6 is a schematic block diagram of a communication system according to an embodiment of the disclosure.

FIG. 6 is a schematic block diagram of a communication system 600 provided by an embodiment of the disclosure. As illustrated in FIG. 6, the communication system 600 includes a UE 610 and a network device 620.

The UE 610 can be used to realize the corresponding functions realized by the UE in the above method, and the network device 620 can be used to realize the corresponding functions realized by the network device in the above method. For the sake of simplicity, it will not be elaborated here.

It is to be understood that the processor of the embodiment of the disclosure may be an integrated circuit chip with signal processing capability. In the implementation process, each step of the above method embodiment can be completed by the instruction in the form of integrated logic circuit of hardware or software in the processor. The above processors can be general purpose processors, digital signal processors (DSPs), application specific integrated circuits (ASICs), field programmable gate arrays (FPGAs) or other programmable logic devices, discrete gate or transistor logic devices, and discrete hardware components. The disclosed methods, steps and logic block diagrams in the embodiments of the disclosure can be implemented or executed. The general-purpose processor may be a microprocessor or the processor may be any conventional processor or the like. The steps of the method disclosed in connection with the embodiment of the disclosure can be directly embodied to be executed and completed by the hardware decoding processor, or by the combination of the hardware and software modules in the decoding processor. The software module can be arranged in a random memory, flash memory, read-only memory, programmable read-only memory or electrically erasable programmable memory, register and other mature storage media in the art. The storage medium is located in the memory, and the processor reads the information in the memory and completes the steps of the above method in combination with hardware thereof.

It is to be understood that the memory in the embodiments of the disclosure may be a volatile memory or a non-volatile memory, or may include both volatile and non-volatile memory. The nonvolatile memory can be a read-only memory (ROM), a programmable ROM (PROM), an erasable PROM (EPROM), an electrically erasable EPROM (EEPROM) or a flash memory. The volatile memory can be a random access memory (RAM), which is used as an external cache. Based on exemplarily but unrestrictive description, many forms of RAMs are available, such as a static RAM (SRAM), a dynamic RAM (DRAM), a synchronous DRAM (SDRAM), a double data rate SDRAM (DDR SDRAM, an enhanced SDRAM (ESDRAM), a synchlink DRAM (SLDRAM) and a direct Rambus RAM (DR RAM). It is to be noted that the memory of the systems and methods described herein is intended to include, but is not limited to, these and any other suitable types of memory.

It is to be understood that the above described memory is exemplary but not restrictive. For example, the memory in the embodiment of the disclosure may also be a static RAM (SRAM), a dynamic RAM (DRAM), a synchronous dynamic random access memory (synchronous DRAM (SDRAM), a double data rate SDRAM (DDR SDRAM), an enhanced SDRAM (ESDRAM), a synchronous link DRAM (SLDRAM), a direct Rambus RAM (DR RAM), etc. That is to say, the memory in the embodiments of the disclosure is intended to include, but not limited to, these and any other suitable types of memory.

The embodiments of the disclosure further provide a computer-readable storage medium for storing computer programs.

Optionally, the computer-readable storage medium may be applied to the network device in the embodiment of the disclosure, and the computer program enables the computer to execute the corresponding processes implemented by the network device in the various methods of the embodiment of the disclosure. For the sake of brevity, it will not be repeated here.

Optionally, the computer-readable storage medium can be applied to the mobile terminal/UE in the embodiment of the disclosure, and the computer program enables the computer to execute the corresponding processes implemented by the mobile terminal/UE in the various methods of the embodiment of the disclosure. For the sake of brevity, it will not be repeated here.

The embodiment of the disclosure further provides a computer program product, including a computer program instruction.

Optionally, the computer program product may be applied to the network device in the embodiments of the disclosure, and the computer program instruction enables the computer to execute the corresponding flows implemented by the network device in the various methods of the embodiment of the disclosure. For the sake of brevity, it will not be repeated here.

Optionally, the computer program product can be applied to the mobile terminal/UE in the embodiments of the disclosure, and the computer program instruction enables the computer to execute the corresponding flows implemented by the mobile terminal/UE in the various methods of the embodiment of the disclosure, for the sake of brevity, it will not be repeated here.

The embodiment of the disclosure also provides a computer program.

Optionally, the computer program can be applied to the network device in the embodiments of the disclosure. When the computer program runs on the computer, the computer executes the corresponding process realized by the network device in each method of the embodiment of the disclosure. For the sake of brevity, it will not be described here.

Optionally, the computer program can be applied to the mobile terminal/UE in the embodiments of the disclosure. When the computer program runs on the computer, the computer executes the corresponding flow realized by the mobile terminal/UE in the various methods of the embodiment of the disclosure. For the sake of brevity, it will not be elaborated here.

Those of ordinary skill in the art may realize that the unit and algorithm steps of each example described in combination with the disclosed embodiments herein can be realized by electronic hardware, or the combination of computer software and electronic hardware. Whether these functions are performed in hardware or software depends on the specific application and design constraints of the technical solution. A professional technician may use different methods to implement the described functions for each specific application, but such implementation shall not be considered beyond the scope of the disclosure.

Those skilled in the art can clearly understand that for the convenience and simplicity of the description, the specific working process of the system, device and unit described above can refer to the corresponding process in the embodiment of the method described above, and will not be described here.

In several embodiments provided by the disclosure, it should be understood that the disclosed systems, devices and methods can be realized in other ways. For example, the embodiment of the device described above is only schematic. For example, the division of the units is only a logical function division, and there can be another division method in actual implementation, for example, multiple units or components can be combined or integrated into another system, or some features can be ignored or not implemented. On the other hand, the mutual coupling or direct coupling or communication connection illustrated or discussed can be indirect coupling or communication connection through some interfaces, devices or units, and can be electric, mechanical or other forms.

The unit described as a separation part may or may not be physically separated, and the component displayed as a unit may or may not be a physical unit, that is, it may be located in one place, or it may be distributed to multiple network units. Some or all of the units can be selected according to the actual needs to achieve the purpose of the embodiment.

In addition, each functional unit in each embodiment of the disclosure may be integrated in one processing unit, each unit may exist physically alone, or two or more units may be integrated in one unit.

If the function is realized in the form of a software function unit and sold or used as an independent product, the function can be stored in a computer readable storage medium. Based on such understanding, essential parts of the technical solution of the disclosure or the parts of the technical solution making contributions to the conventional art, or the part of the technical solution may be embodied in the form of a software product. The computer software product is stored in a storage medium, which includes several instructions for making a computer device (which can be a personal computer, a server, a network device, etc.) to perform all or a part of the steps of the method according to each embodiment of the disclosure. The aforementioned storage media include: a U disk, a mobile hard disk, a read-only memory (ROM), a random access memory (RAM), a disk or optical disk and other media that can store a program code.

The foregoing is only the specific embodiments of the disclosure, but the scope of protection of the disclosure is not limited thereto. Any person skilled in the technical field who can easily think of change or replacement within the technical scope of the disclosure shall be covered in the scope of protection of the disclosure. Therefore, the protection scope of the disclosure shall be subject to the protection scope of the claims.

The invention claimed is:

1. A method for determining a priority level of a channel state information (CSI) report, comprising:
   determining, by a user equipment (UE), priority levels of at least two CSI reports based on a reporting content carried in the CSI report, wherein the at least two CSI reports comprise a first CSI report, and the first CSI report carries Layer 1 Signal to Interference Noise Ratio (L1-SINR); and
   reporting, by the UE through the first CSI report, N reference signal resource indicators and an L1-SINR corresponding to each of the N reference signal resource indicators, wherein N is a positive integer,
   wherein the priority levels of the at least two CSI reports are used to multiplex the at least two CSI reports or drop at least a part of the at least two CSI reports in response to that there is an overlapping part in time domain resources of the at least two CSI reports;
   wherein the determining by the UE priority levels of at least two CSI reports based on the reporting content carried in the CSI report comprises:
   determining, by the UE, that the priority level of the first CSI report is lower than the priority level of a second CSI report and the priority level of the first CSI report is higher than the priority level of a third CSI report,
   wherein the third CSI report carries a layer-1 reference signal received power (L1-RSRP), and the second CSI report carries CSI reporting quantities other than the L1-SINR and the L1-RSRP.

2. The method of claim 1, wherein the determining by the UE that the priority level of the first CSI report is lower than the priority level of a second CSI report and the priority level of the first CSI report is higher than the priority level of a third CSI report comprises:
   determining, by the UE, that a priority value of the first CSI report is higher than a priority value of the second CSI report and the priority value of the first CSI report is lower than a priority value of the third CSI report.

3. The method of claim 2, wherein the CSI report is associated with a priority value $Pri_{iCSI}(y, k, c, s)$, and the priority value $Pri_{iCSI}(y, k, c, s)$ is determined according to an equation:

$$Pri_{iCSI}(y,k,c,s)=2 \cdot N_{cells} \cdot M_s \cdot y + N_{cells} \cdot M_s \cdot k + M_s \cdot c + s$$

wherein y=0 for an aperiodic CSI report to be carried on a physical uplink shared channel (PUSCH), y=1 for a semi-persistent CSI report to be carried on the PUSCH, y=2 for a semi-persistent CSI report to be carried on a physical uplink control channel (PUCCH), and y=3 for a periodic CSI report to be carried on the PUCCH;
   k=0 for a CSI report which carries the L1-RSRP or the L1-SINR, and k=1 for a CSI report which does not carry the L1-SINR and L1-SINR;
   c denotes a serving cell index, and $N_{cells}$ denotes a value of a higher layer parameter maxNrofServingCells, s denotes a report configuration ID reportConfigID, and $M_s$ denotes a value of the higher layer parameter maxNrofCSI-ReportConfigurations.

4. The method of claim 1, wherein in a case of N>1, the reporting an L1-SINR corresponding to each of the N reference signal resource indicators comprises:
   reporting an L1-SINR of a first reference signal resource indicator of the N reference signal resource indicators, and a differential L1-SINR of an L1-SINR, in relative to the L1-SINR of the first reference signal resource indicator, of each of N-1 reference signal resource indicators except the first reference signal resource indicator of the N reference signal resource indicators.

5. The method of claim 4, wherein the L1-SINR of the first reference signal resource indicator has a greatest value among the N reference signal resource indicators.

6. The method of claim 4, wherein a reported value of the L1-SINR of the first reference signal resource indicator is characterized by M1 bits, and the reported value of the L1-SINR of the first reference signal resource indicator is determined based on a range where a measured quantity value of the L1-SINR of the first reference signal resource indicator is located, M1 is a positive integer.

7. The method of claim 6, wherein M1 is equal to 7.

8. The method of claim 4, wherein a reported value of the differential L1-SINR of each of the N-1 reference signal resource indicators is characterized by M2 bits, and the reported value of the differential L1-SINR of the reference signal resource indicator is determined based on a range where a measured quantity value of the differential L1-SINR of the reference signal resource indicator is located, M2 is a positive integer, and
   the measured quantity value of the differential L1-SINR of the reference signal resource indicator refers to a difference of the measured quantity value of the L1-SINR of the reference signal resource indicator relative to the measured quantity value of the L1-SINR of the first reference signal resource indicator.

9. The method of claim 8, wherein M2 is equal to 3 or 5.

10. The method of claim 8, wherein 1 dB step size is used for the reported value of the differential L1-SINR.

11. A device for determining a priority level of a channel state information (CSI) report, comprising:
    a processor; and
    a memory configured to store a computer program,
    wherein the processor is configured to call and run the computer program stored in the memory to:
    determine priority levels of at least two CSI reports based on a reporting content carried in the CSI report, wherein the at least two CSI reports comprise a first CSI report, and the first CSI report carries Layer 1 Signal to Interference Noise Ratio (L1-SINR); and
    report N reference signal resource indicators and an L1-SINR corresponding to each of the N reference signal resource indicators, wherein N is a positive integer,
    wherein the priority levels of the at least two CSI reports are used to multiplex the at least two CSI reports or drop at least a part of the at least two CSI reports in response to that there is an overlapping part in time domain resources of the at least two CSI reports;
    wherein the processor is configured to call and run the computer program stored in the memory to:
    determine that the priority level of the first CSI report is lower than the priority level of a second CSI report and the priority level of the first CSI report is higher than the priority level of a third CSI report, wherein the third CSI report carries a layer-1 reference signal received power (L1-RSRP), and the second CSI report carries CSI reporting quantities other than the L1-SINR and the L1-RSRP.

* * * * *